United States Patent [19]

Tajima et al.

[11] Patent Number: 4,661,754
[45] Date of Patent: Apr. 28, 1987

[54] CONTROL CIRCUIT FOR A STEPPING MOTOR

[75] Inventors: Taiji Tajima, Yokohama; Shigemitsu Higuchi, Fujisawa, both of Japan

[73] Assignee: Hitachi, Ltd., Tokyo, Japan

[21] Appl. No.: 732,696

[22] Filed: May 10, 1985

[30] Foreign Application Priority Data

May 14, 1984 [JP] Japan .................. 59-94616

[51] Int. Cl.$^4$ .............................................. H02P 8/00
[52] U.S. Cl. ..................................... 318/696; 318/685
[58] Field of Search ................................ 318/696, 685

[56] References Cited

U.S. PATENT DOCUMENTS 4,151,448 4/1975 Azuma .............................. 318/138
4,417,188 11/1983 Makabe et al. .................... 318/696

Primary Examiner—William M. Shoop, Jr.
Assistant Examiner—Paul M. Bergmann
Attorney, Agent, or Firm—Antonelli, Terry & Wands

[57] ABSTRACT

A control circuit comprises a first counter for counting up stepping pulses and counting down the number of steps of a stepping motor, a memory for storing therein a drive timing of the stepping motor, a variable timer for converting a data in the memory to a real time, a second counter for counting up an output signal of the variable timer when a count of the second counter is smaller than a count of the first counter and counting down the output signal of the variable timer when the count of the second counter is equal to or larger than the count of the first counter, and a drive circuit for driving the stepping motor in accordance with the output signal of the variable timer.

Signals to set the first counter in the count-up mode and the count-down mode are synchronized with two clock signals having the same frequency and different phases. The control circuit drives the stepping motor immediately after the control pulse signal was applied to accelerate or decelerate the stepping motor so that a velocity pattern of the stepping motor is controlled in a pedestal pattern.

4 Claims, 9 Drawing Figures

[A>B, K=1]
[A≤B, K=0]

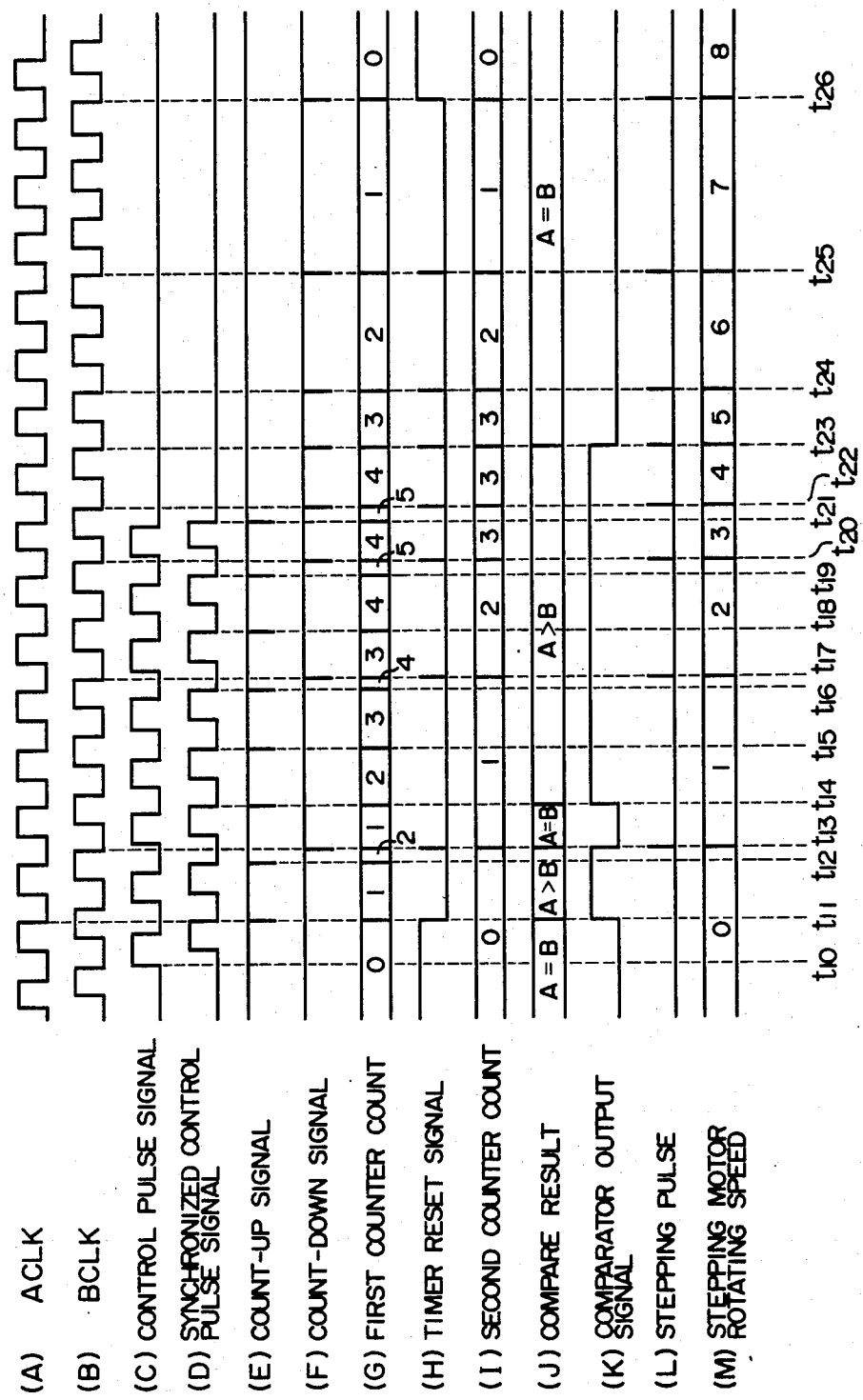

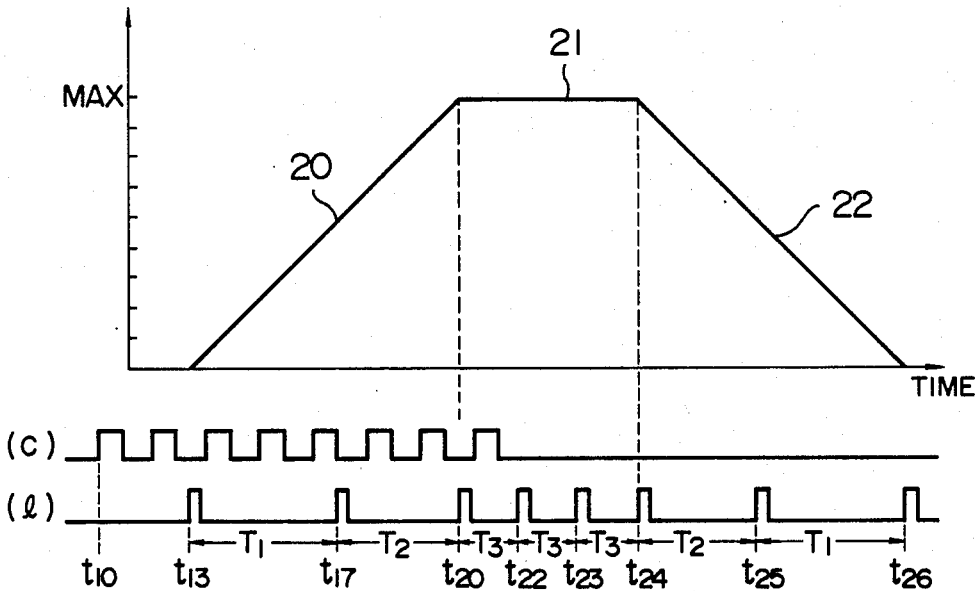

CONTROL CIRCUIT FOR A STEPPING MOTOR

BACKGROUND OF THE INVENTION

The present invention relates to a control circuit for a stepping motor for positioning a transducer used in a magnetic disk unit or an optical disk unit, and more particularly to a control circuit for a stepping motor which enables positioning of a transducer in a short time.

A stepping motor has been widely used in a magnetic disk unit or an optical disk unit as a relatively inexpensive positioning mechanism. As drive method for the stepping motor, a constant velocity control method and a pedestal type velocity control method have been known by such as Japanese Patent Application Laid-Open No. 55-136896. Those drive methods are explained with reference to FIG. 1.

In the constant velocity control method, a control pulse signal having a substantially constant pulse interval $T_C$ is supplied to the control circuit for the stepping motor from a high level controller so that a stepping pulse $P_C$ shown in FIG. 1(a) is supplied to the stepping motor. As a result, the stepping motor is rotated at a substantially constant speed $W_C$ from time $t_o$ to time $t_e$ as shown by a line a' in FIG. 1. At time $t_s$, a transducer driven by the stepping motor is positioned at a desired position. If the interval $T_C$ of the stepping pulse is sufficiently large, the stepping motor is intermittently driven.

In the pedestal type velocity control method, a plurality of control pulse signals are successively supplied to the stepping motor control circuit from the higher level controller during time period $T_B$. The stepping motor control circuit accelerates the stepping motor in accordance with the number of applied control pulse signals from time $t_1$ to time $t_2$ as shown by b' in FIG. 1, rotates the stepping motor at a maximum speed $W_T$ from time $t_2$ to time $t_3$ and decelerates the stepping motor after time $t_3$. Since the rotating speed $W_T$ is sufficiently higher than the rotating speed $W_C$, the transducer driven by the stepping motor is positioned to the desired position at time $t_4$ which is earlier than time $t_s$. A data for producing the stepping pulses to be supplied to the stepping motor to perform the pedestal type velocity control is usually stored in a read-only memory (ROM).

In the prior art control circuit for the stepping motor, one of the above two velocity control methods has been used.

Referring to FIG. 2, the prior art control method for the stepping motor is explained. In a step $S_1$, a count of a pulse counter of the control circuit is set to an initial count $N=1$. In a step $S_2$, the control circuit checks if the control pulse has been supplied. If it has not been supplied, the step $S_2$ is again repeated. If the control pulse signal is supplied to the control circuit, a time interval $T_I$ between the applied control pulse and the next input pulse is measured in a step $S_3$. If the time interval $T_I$ is $T_I \geq X$ (where X is a predetermined time period), that is, if the next control pulse signal is not applied within the time period X, the stepping motor is driven by one step in a step $S_4$. In a step $S_5$, the count N of the counter is set to $N-1$. In a step $S_6$, the count N of the counter is checked. If $N=0$, the process returns to the step $S_1$. Through the steps $S_1$, $S_2$, $S_3$, $S_4$, $S_5$ and $S_6$, the constant velocity control method is performed. By repeating the steps $S_1$ to $S_6$, the constant velocity control is attained. In the step $S_3$, if the time interval $T_I$ of the input control pulse signal is $T_I < X$, the count N of the counter is set to $N+1$ in a step $S_7$. While the control pulse signals having the time interval $T_I$ ($T_I < X$) are applied to the steps $S_2$, $S_3$ and $S_7$, the count N of the counter is incremented by "1" each time. In the step $S_3$, if the next pulse is not supplied within the time period X, the stepping motor is driven by one step in the step $S_4$. In the step $S_5$, the count N of the counter is decremented by one, and in the step $S_6$, the count N of the counter is checked. If $N \neq 0$, stepping pulses for the pedestal type velocity control are generated in steps $S_8$ and $S_9$. In the step $S_8$, a time interval T(N) of the stepping pulses to be supplied to the stepping motor is read out of the read-only memory (ROM) in accordance with the count N of the counter. In the step $S_9$, the stepping pulses having the pulse interval T(N) are produced based on the data read in the step $S_8$. Then, the process returns to the step $S_4$ in which the stepping pulses are supplied to the stepping motor. The steps $S_4$, $S_5$, $S_6$, $S_8$ and $S_9$ are repeated until the count N of the counter reaches zero. The pedestal type velocity control is attained by the steps $S_1$, $S_2$, $S_3$, $S_7$, ..., $S_2$, $S_3$, $S_7$, ..., $S_4$, $S_5$, $S_6$, $S_8$, $S_9$, ..., $S_4$, $S_5$, $S_6$, $S_8$, $S_9$, ..., $S_4$, $S_5$, $S_6$. The time interval T(N) of the stepping pulses is a function of N. When the count N is larger than a first predetermined value $P_1$, the pulse interval T(N) gradually decreases, when the count N is between the first value $P_1$ and a second value $P_2$, the pulse interval T(N) is constant, and when the count N is smaller than the second value $P_2$, the pulse interval T(N) gradually increases. By the change of the pulse interval T(N), the pedestal type velocity control is attained.

As described above in the prior art pedestal type velocity control method for the stepping motor, the drive of the stepping motor is started after the reception of all control pulse signals sent from the higher level controller to the control circuit. Therefore, a long time is required to position the transducer. This time increases as the number of control pulse signals or the number of stepping pulses increases.

SUMMARY OF THE INVENTION

It is an object of the present invention to provide a control circuit for a stepping motor which can quickly start the stepping motor and position a transducer in a short time, and more particularly a control circuit which can position the transducer in a short time even in a pedestal type velocity control.

BRIEF DESCRIPTION OF THE DRAWINGS

FIG. 4 is a timing chart for signals in the control circuit of the present invention, FIG. 5 shows data and their addresses stored in a ROM of the control circuit of the present invention, FIGS. 6, 8 and 9 show velocity control patterns of the control circuit of the present invention.

DESCRIPTION OF THE PREFERRED EMBODIMENTS

Figure 1:
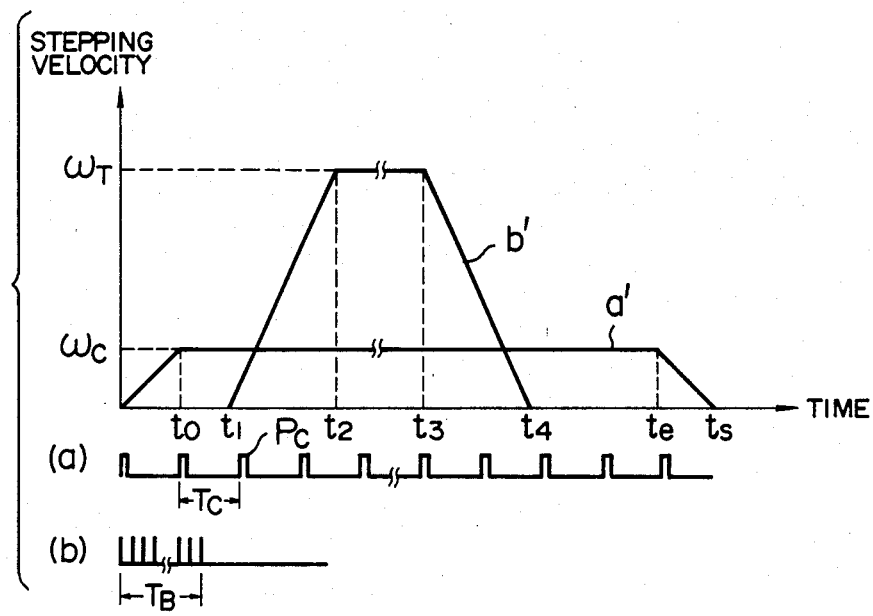
FIG. 1 shows a velocity control pattern of a stepping motor.
Figure 3:
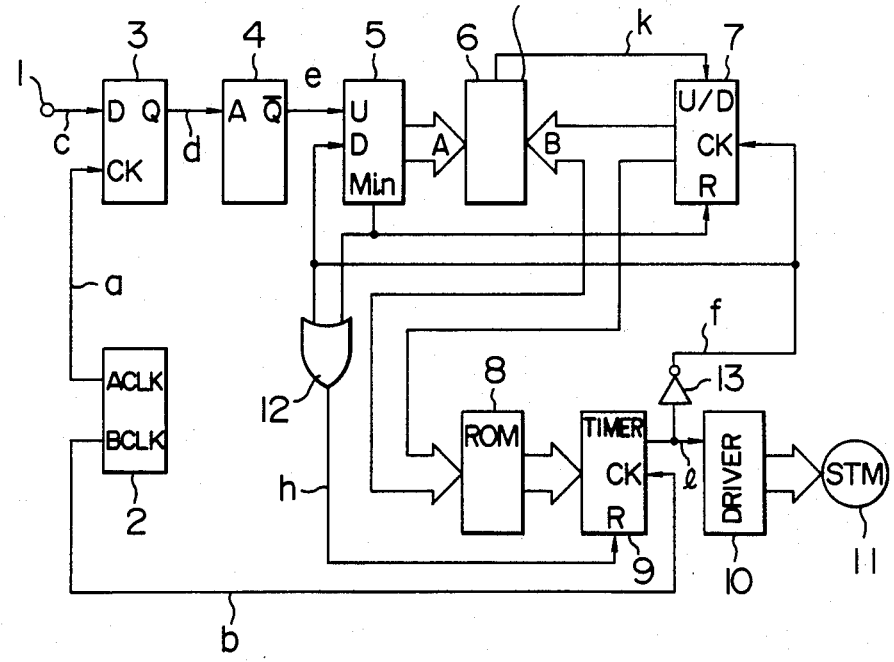
FIG. 3 is a block diagram of a control circuit of the present invention.
Figure 2:
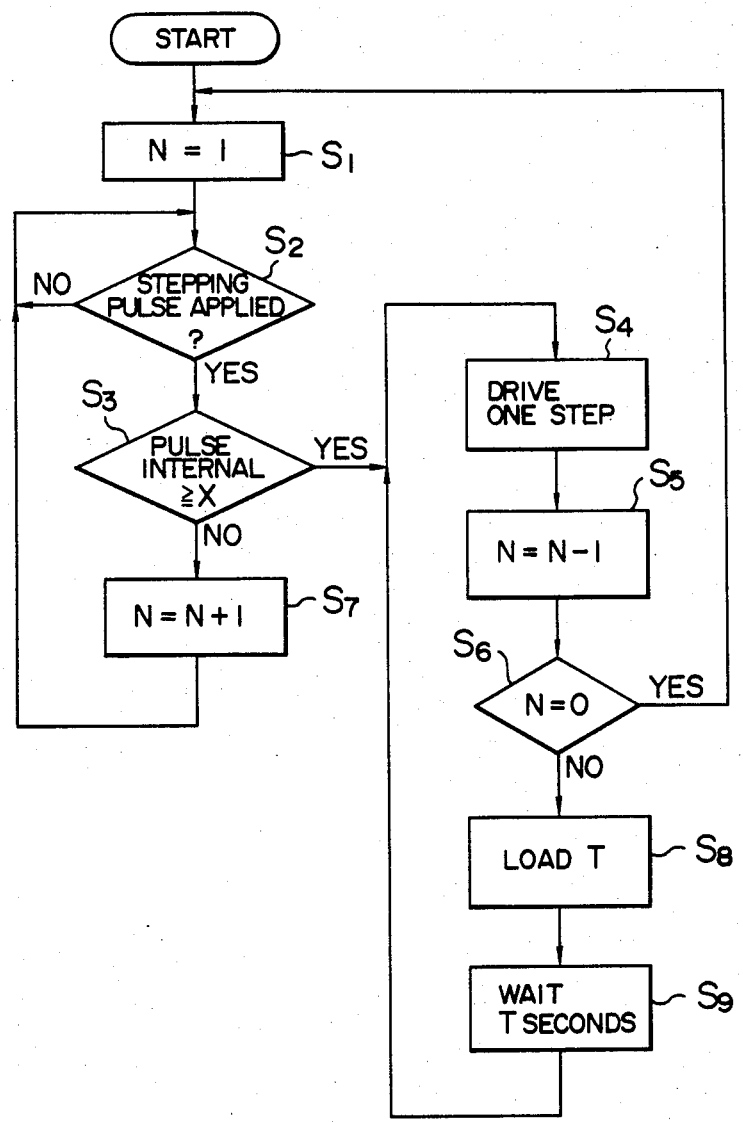
FIG. 2 is a flow chart showing a control procedure of a stepping motor in a prior art control circuit.

One embodiment of the present invention is explained with reference to FIGS. 3 and 4. Symbols a-m on signal lines in FIG. 3 correspond to symbols (a)-(m) in FIG. 4, respectively.

A control pulse signal (c) supplied from a higher level controller (not shown) is applied to a terminal 1. An oscillator 2 generates two clock signals ACLK (a) and BCLK (b) which are of the same frequency and have a phase difference of $\pi/2$ (radian) from each other. The control pulse signal (c) applied to the terminal 1 and the clock signal (a) are supplied to a D flip-flop (delayed flip-flop) 3 in which the control pulse signal (c) is synchronized with the clock signal (a), and a synchronized control pulse signal (d) from the D flip-flop 3 is supplied to a monostable multivibrator 4 which is a wave shaper and generates a count-up signal (e) at a negative-going edge of the synchronized control pulse signal. The signal (e) is supplied to a first counter 5 which is an up-/down counter and counts up when the signal is applied to its U-terminal and counts down when the signal is applied to its D-terminal. The up/down counter 5 generates an output signal when a count A thereof is 0. The count of the counter 5 is supplied to a comparator 6 to which a count B of a second counter 7 is also applied. The comparator 6 compares the count A of the counter 5 with the count B of the counter 7 and generates a signal (k) which is of high level (e.g., 1) when the count A of the counter 5 is larger than the count B of the counter 7 and of low level (e.g., 0) when the count A of the counter 5 is no larger than the count B of the counter 7. The signal (k) is supplied to an U/D terminal of the counter 7, which counts up signals applied to a CK terminal when the signal applied to the U/D terminal is high level and counts down signals applied to the CK terminal when the signal applied to the U/D terminal is low level. When the count of the counter 7 reaches a predetermined count, it is held at that count or a maximum count. The counter 7 is reset by an output signal from a Min terminal of the counter 5. The count of the counter 7 is supplied to a ROM 8 in which data are stored at addresses corresponding to the counts of the counter 7. A data stored at the address corresponding to the count of the counter 7 is read out of the ROM 8. When the count of the counter 7 is small, a data of a large value is read from the ROM 8, and when the count of the counter 7 is large, a data of a small value is read from the ROM 8. The data is supplied to a timer 9 to which the clock signal (b) from the oscillator 2 is also supplied. The frequency of the clock signal (b) is same as that of the clock signal (a) and the phase of the clock signal (b) is different from that of the clock signal (a) by $\pi/2$. The timer 9 counts the clock signals (b) in accordance with the data supplied fromm the ROM 8, and produces an output signal (l) when the count thereof reaches the data value. Accordingly, a time interval of the output signals (l) of the timer 9 changes with the data supplied from the ROM 8. The output signal (l) from the timer 9 is supplied to a driver 10 in which the output signal (l) is power-amplified, and the output signal from the driver 10 is supplied to a stepping motor 11 which is driven by the power-amplified output signal (l). The output signal (l) of the timer 9 is also applied to an inverter 13 which phase-inverts the signal (l) to produce a signal (f), which is supplied to the counter 5, the counter 7 and an OR gate 12. The count of the counter 5 is decremented by one by the signal (f). The count of the counter 7 is incremented by one or decremented by one by the signal (f). The selection of the incrementation or the decrementation in the counter 7 is determined by the state of the signal (k). The output signal from the Min terminal of the counter 5 is supplied to the OR gate 12, and an output signal (h) of the OR gate 12 is supplied to the timer 9 to reset the timer 9. The timer 9 is reset when the count of the counter 5 is 0 or when the timer 9 generates the output signal (l).

The function of the circuit is next explained under the condition that the count of the counter 5 is 0 and the counter 7 and the timer 9 are in the reset state, the control pulse signal (c) is applied to the terminal 1 at time $t_0$. The control pulse signal (c) is synchronized with the clock signal (a) by the D flip-flop 3 at times $t_{11}$, $t_{12}$, $t_{14}$, $t_{15}$, $t_{18}$, $t_{19}$ and $t_{21}$ to produce the signal (d), which is supplied to the multivibrator 4. The multivibrator 4 generates the count-up signals at times $t_{11}$, $t_{12}$, $t_{14}$, $t_{15}$, $t_{16}$, $t_{18}$, $t_{19}$ and $t_{21}$, which are supplied to the counter 5. When the counter 5 counts the signal (e) at time $t_{11}$, the output signal at the Min terminal of the counter 5 extinguishes and the resetting of the counter 7 and the timer 9 is released. At time $t_{11}$, the count of the counter 5 reaches "1" and at time $t_{12}$, it reaches "2". Since the count of the counter 5 is "1" and the count of the counter 7 is "0" at time $t_{11}$, the output signal (k) of the comparator 6 is high level at time $t_{11}$. As a result, the counter 7 operates in the count-up mode. When the resetting of the timer 9 is released at time $t_{11}$, the timer 9 starts to count the clock signal (b). When the count of the counter 7 is "0", the data "1" stored at the address "0" of the ROM 8 is read and it is supplied to the timer 9. FIG. 5 shows a relation between the data and the addresses stored in the ROM 8. If the data supplied to the timer 9 is "1", the timer 9 generates the output signal (l) at time $t_{13}$ after it has counted one clock signal (b). The output signal (l) is supplied to the stepping motor 11 through the driver 10 so that the stepping motor 11 is rotated by one step. The output signal (l) of the timer 9 is supplied to the inverter 13 which produces the signal (f), which in turn is supplied to the counter 7, the counter 5 and the OR gate 12. The count of the counter 7 reaches "1" at time $t_{13}$. The count of the counter 5 is decremented by one by the signal (f) and reaches "1" at time $t_{13}$. The signal (f) supplied to the OR gate 12 becomes the signal (h) by which the timer 9 is reset. When the count of the counter 7 reaches "1", the data "3" stored at the address "1" of the ROM 8 is supplied to the timer 9 after time $t_{13}$. The timer 9 resumes to count the clock signal (b). At time $t_{13}$, the count of the counter 5 is equal to the count of the counter 7. Accordingly, the output signal (k) of the comparator 6 is low level. When the count-up signal (e) is supplied to the counter 5 at times $t_{14}$, $t_{15}$ and $t_{16}$, the count of the counter 5 assumes 2 at time $t_{14}$, "3" at time $t_{15}$ and "4" at time $t_{16}$. The output signal (k) of the comparator 6 is again high level at time $t_{14}$. As the timer 9 counts three clock signals (b), the timer 9 again produces the output signal (l) at time $t_{17}$. As a result, the count of the counter 5 is decremented by one at time $t_{17}$ and the count of the counter 7 is incremented by one to "2" and the timer 9 is again reset. The data "2" corresponding to the count "2" of the counter 7 is supplied from the ROM 8 to the timer 9. At time $t_{17}$, the stepping motor 11 makes a second step. When the count-up signal (e) is supplied to the counter 5 at times $t_{18}$ and $t_{19}$, the count of the counter 5 is incremented and at time $t_{19}$ the count reaches "5".

When the output signal (l) is again produced by the timer 9 at time $t_{20}$, the count of the counter 5 reaches "4", the count of the counter 7 reaches "3" and the timer 9 is reset. The data "1" stored at the address "3" of the ROM 8 is supplied to the timer 9. When the count-up signal (e) is supplied to the counter 5 at time $t_{21}$, the count of the counter 5 again reaches "5". When the timer 9 produces the output signal (l) at time $t_{22}$, the count of the counter 5 again reaches "4" and the timer 9 is reset. A maximum count of the counter 7 is predetermined. In the present embodiment, the maximum count is "3". Accordingly, where the output signal (l) is supplied to the counter 7 at time $t_{22}$, the count of the counter 7 is held at "3". When the timer 9 produces the output signal (l) at time $t_{23}$, the count of the counter 5 reaches "3" and the timer 9 is reset. The count of the counter 7 is held at "3" at time $t_{23}$. As a result, the output signal (k) of the comparator 6 is low level. When the timer 9 produces the output signal (l) at time $t_{24}$, the counter 7 counts down as the counter 5 does and their counts reach "2". A similar operation occurs at times $t_{25}$ and $t_{26}$. As the count of the counter 5 reaches "0" at time $t_{26}$, the output signal continuously appears at the Min terminal and the timer 9 is reset. At time $t_{24}$, the data "2" at the address "2" of the ROM 8 is supplied to the timer 9, and at time $t_{25}$ the data "1" at the address "2" of the ROM 8 is supplied to the timer 9. At times $t_{13}$, $t_{17}$, $t_{20}$, $t_{22}$, $t_{23}$, $t_{24}$, $t_{25}$ and $t_{26}$, the stepping motor 11 is driven by the driver 10 in accordance with the output signal (l) of the timer 9. A time interval $T_2$ between times $t_{17}$ and $t_{20}$ is shorter than a time interval $T_1$ between times $t_{13}$ and $t_{17}$, and a time interval $T_3$ between times $t_{20}$ and $t_{26}$ is shorter than the time interval $T_2$. A time interval between times $t_{22}$ and $t_{23}$ and a time interval between times $t_{23}$ and $t_{24}$ are equal to the time interval $T_3$. A time interval between times $t_{24}$ and $t_{25}$ is equal to the time interval $T_2$ and a time interval between $t_{25}$ and $t_{26}$ is equal to the time interval $T_1$. Accordingly, as shown by a line 20 in FIG. 6, the stepping motor 11 is accelerated between times $t_{13}$ and $t_{20}$, and between times $t_{20}$ and $t_{24}$, the stepping motor 11 is rotated at a constant speed as shown by a line 21, and the stepping motor is decelerated between times $t_{24}$ and $t_{26}$ as shown by a line 22. After time $t_{26}$, the stepping motor 11 is stopped to rotate.

Figure 7:
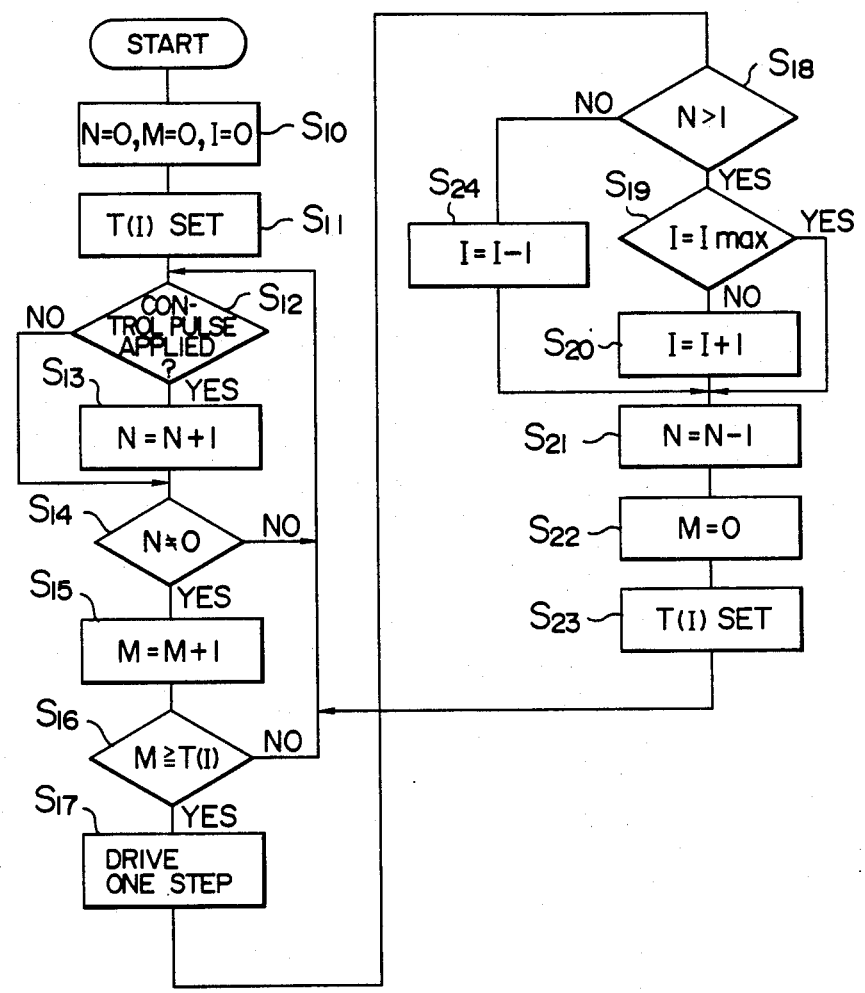
FIG. 7 is a flow chart showing a control procedure of a stepping motor in the control circuit of the present invention.

FIG. 7 shows a flow chart in the control circuit of the present invention. In a step $S_{10}$, the count N of the counter 5, the counter M of the timer 9 and the count I of the counter 7 are set to the initial state "0". In a step $S_{11}$, the data T(I) to be supplied to the timer 9 from the ROM 8 is set in accordance with the count I=0 of the counter 7. In a step $S_{12}$, the control pulse signal is applied to the terminal 1, and the counter 5 starts to count is a step $S_{13}$. As the count of the counter 5 changes from "0", the resetting of the counter 7 and the timer 9 is released in a step $S_{14}$. In a step $S_{15}$, the timer 9 starts to count the clock signals (b). In a step $S_{16}$, if the count M of the counter 9 reaches or exceeds the data T(I) supplied from the ROM 8 to the timer 9, the timer 9 produces the output signal (l) in a step $S_{17}$ and the stepping motor 11 is rotated by one step. In a step $S_{18}$, the counts of the counters 5 and 7 are compared by the comparator 6. In steps 19 and 20, if the count of the counter 7 is not equal to the maximum count, the count of the counter 7 is incremented by one. In a step $S_{21}$, the count of the counter 5 is decremented by one. In a step $S_{22}$, the timer 9 is reset. If the count of the counter 5 is no larger than the count of the counter 7, the count of the counter 7 is decremented by one in a step $S_{24}$. In a step $S_{23}$, the data T(I) corresponding to the count of the counter 7 is again supplied from the ROM 8 to the timer 9. Then, the steps $S_{12}$ to $S_{23}$ are repeated again. In the above explanation, the addresses and the data shown in FIG. 5 are diagramatically shown.

Figure 8:
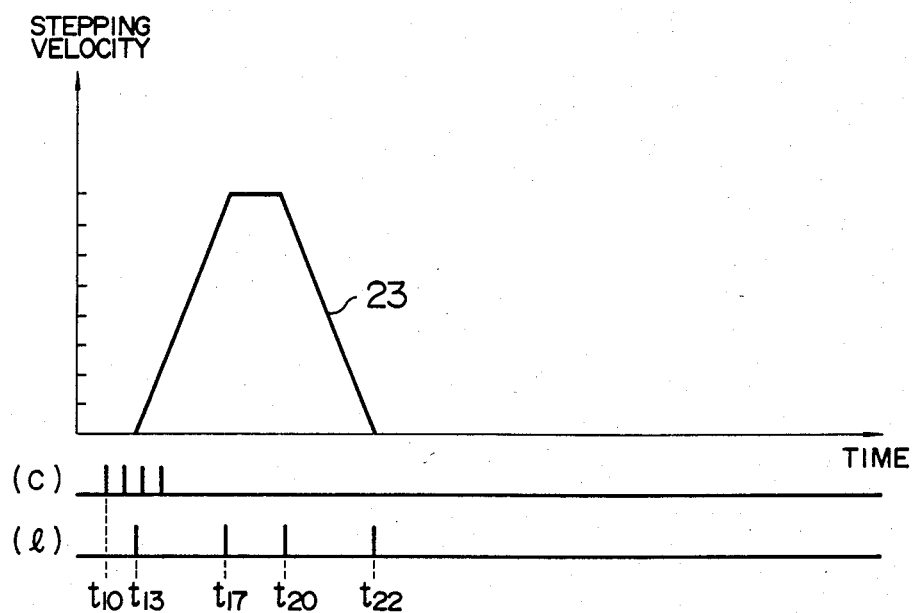

FIG. 8 shows a pattern of speed change of the stepping motor 11 when only four control pulse signals (c) are supplied after time $t_{10}$. When the number of control pulse signals (c) is small, the rotating speed of the stepping motor 11 is accelerated and then decelerated before it reaches the maximum speed as shown by a line 23.

Figure 9:
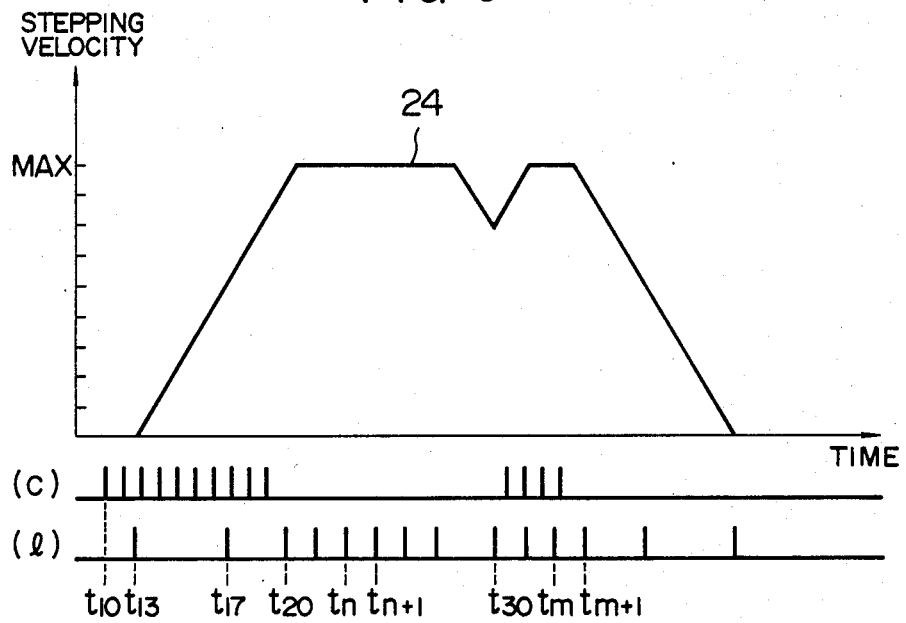

FIG. 9 shows a velocity pattern of the stepping motor 11 when ten control pulse signals (c) are applied after time $t_{10}$ and then four control pulse signals are further supplied after time $T_{30}$. As shown by a line 24 in FIG. 9, the control circuit of the present invention again accelerates the stepping motor 11 after time $t_{30}$ by the control pulse signals (c) applied to the terminal 1. The prior art control circuit could not drive the stepping motor by the control pulse signals supplied after time $t_{30}$.

The count-up signal (e) in the control circuit of the present invention is synchronized with the first clock signal (a), and the count-down signal (f) is synchronized with the second clock signal (b). The phase of the first clock signal (a) is different from that of the second clock signal (b) by $\pi/2$. Accordingly, it does not happen that the count-up signal (e) and the count-down signal (f) are simultaneously supplied to the counter 5. Accordingly, when the control pulse signal (c) is supplied to the terminal 1 at any time $t_{30}$, the counter 5 can exactly count the pulse signal (c) and the stepping motor 11 is correctly controlled.

If the time interval between the control pulse signals (c) applied to the terminal 1 is longer than the time interval between the output signals (l) of the timer 9, the count of the counter 5 returns to "0" before the second control pulse signal (c) is supplied to the counter 5 so that the stepping motor 11 is not accelerated but intermittently driven by the output signals (l) in synchronism with the control pulse signals (c).

The phase difference between the clock signal (a) and the clock signal (b) of the oscillator 2 need not be $\pi/2$.

In the present embodiment, the acceleration pattern and the deceleration pattern of the stepping motor 11 are shown symmetrically. The acceleration pattern and the deceleration pattern may be changed by designing the circuit such that the addresses of the ROM 8 in the count-up mode of the counter 7 and the addresses of the ROM 8 in the count-down mode of the counter 7 are different.

As described hereinabove, according to the present invention, the stepping motor is driven immediately after the control pulse signal was supplied from the higher level controller. Accordingly, the time required to position the transducer is shortened. The stepping motor is correctly rotated in whatever state the control pulse signal is supplied.

We claim:

1. A control circuit for a stepping motor comprising an oscillator, synchronization means, first and second up/down counters, a comparator, memory means and a timer;

said oscillator generating first and second clock signals having the same frequency and different phases, said first clock signal being supplied to said synchronization means and said second clock signal being supplied to said timer;

said synchronization means being connected to said oscillator and having an input terminal to which control pulse signals equal in number to the number of steps to be stepped by the stepping motor and producing control pulse signals synchronized with the first clock signal;

said first up/down counter being connected to said synchronization means and said timer, counting up the synchronized control pulses supplied from said synchronization means and counting down output signals of said timer;

said comparator being connected to said first up/down counter and said second up/down counter, comparing the count of said first up/down counter with the count of said second up/down counter and generating a first state output signal when the count of said first up/down counter is larger than the count of said second up/down counter, the first state output signal being supplied to said second up/down counter;

said second up/down counter being connected to said timer and said comparator and counting up the output signals supplied from said timer while said first state output signal is supplied thereto from said comparator and counting down the output signals of said timer when said first state output signal is not supplied thereto;

said memory means being connected to said second up/down counter and receiving the count of said second up/down counter and supplying to said timer a data stored at an address thereof corresponding to said count; and said timer being connected to said memory means and said oscillator and counting said second clock signals supplied from said oscillator by the number determined by the data supplied from said memory means, and generating a stepping pulse to be supplied to said stepping motor when the count thereof reaches said number, said timer being reset by said stepping pulse.

2. A control circuit for a stepping motor according to claim 1 wherein said synchronization means is a delayed flip-flop.

3. A control circuit for a stepping motor according to claim 1 wherein a wave shaper having a monostable multivibrator is connected between said synchronization means and said first up/down counter.

4. A control circuit for a stepping motor according to claim 1 wherein a phase of said first clock signal and a phase of said second clock signal are different from each other by $\pi/2$ radian.

* * * * *